US011891538B1

(12) United States Patent
Gross et al.

(10) Patent No.: US 11,891,538 B1
(45) Date of Patent: Feb. 6, 2024

(54) GRADIENT-RESPONSIVE CORROSION-RESISTANT COATINGS

(71) Applicant: HRL Laboratories, LLC, Malibu, CA (US)

(72) Inventors: Adam Gross, Santa Monica, CA (US); John Vajo, West Hills, CA (US); Jason Graetz, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/864,945

(22) Filed: Jul. 14, 2022

Related U.S. Application Data

(60) Provisional application No. 63/237,006, filed on Aug. 25, 2021.

(51) Int. Cl.
  *C09D 5/12* (2006.01)
  *C09D 7/65* (2018.01)
  (Continued)

(52) U.S. Cl.
  CPC ............ *C09D 5/12* (2013.01); *C09D 1/00* (2013.01); *C09D 4/06* (2013.01); *C09D 7/65* (2018.01)

(58) Field of Classification Search
  CPC ... C09D 5/12; C09D 1/00; C09D 4/06; C09D 7/65
  (Continued)

(56) References Cited

U.S. PATENT DOCUMENTS

| 3,435,003 A | 3/1969 | Craven |
| 3,810,874 A | 5/1974 | Mitsch et al. |

(Continued)

FOREIGN PATENT DOCUMENTS

| EP | 1558661 B1 | 12/2012 |
| WO | 1997035919 A1 | 10/1997 |

(Continued)

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

(Continued)

*Primary Examiner* — Callie E Shosho
*Assistant Examiner* — Steven A Rice
(74) *Attorney, Agent, or Firm* — O'Connor & Company; Ryan P. O'Connor

(57) ABSTRACT

This disclosure provides corrosion-resistant coatings that significantly improve corrosion resistance compared to the prior art. The corrosion protection system senses gradients in electrical potential, pH, and metal ion concentration, and then automatically halts corrosion. Some variations provide a gradient-responsive corrosion-resistant coating comprising: a first layer comprising a transition metal oxide and mobile cations; a second layer comprising a biphasic polymer, wherein the biphasic polymer contains ionic groups, wherein the biphasic polymer comprises a discrete phase and a continuous transport phase, wherein the continuous transport phase is capable of delivering oligomers in response to corrosion byproducts, and wherein the oligomers are ionically crosslinkable with metal cations from a base metal substrate. Other variations provide a corrosion protection system comprising: a base metallic layer; a metal oxide layer comprising a transition metal oxide and mobile cations; a polymer layer comprising a biphasic polymer; and a sealing layer disposed on the polymer layer.

30 Claims, 2 Drawing Sheets

(51) Int. Cl.
  *C09D 1/00* (2006.01)
  *C09D 4/06* (2006.01)
(58) Field of Classification Search
  USPC .......................................................... 428/457
  See application file for complete search history.

(56) References Cited

U.S. PATENT DOCUMENTS

| | | | |
|---|---|---|---|
| 3,847,978 | A | 11/1974 | Sianesi et al. |
| 4,777,224 | A | 10/1988 | Gorzynski et al. |
| 4,956,438 | A | 9/1990 | Ruetman et al. |
| 5,032,666 | A | 7/1991 | Hu et al. |
| 5,084,315 | A | 1/1992 | Karimi et al. |
| 5,189,135 | A | 2/1993 | Cozzi et al. |
| 5,290,418 | A | 3/1994 | Menchen et al. |
| 5,332,798 | A | 7/1994 | Ferreri et al. |
| 5,589,552 | A | 12/1996 | Simeone et al. |
| 5,798,415 | A | 8/1998 | Corpart et al. |
| 5,994,840 | A * | 11/1999 | Forsdyke ................. H01K 1/32 313/493 |
| 6,071,564 | A | 6/2000 | Marchetti et al. |
| 6,183,872 | B1 | 2/2001 | Tanaka et al. |
| 6,579,835 | B2 | 6/2003 | Scicchitano et al. |
| 6,926,937 | B2 | 8/2005 | Extrand et al. |
| 6,992,132 | B2 | 1/2006 | Trombetta et al. |
| 7,655,310 | B2 | 2/2010 | Trombetta |
| 9,136,562 | B2 | 9/2015 | Singh et al. |
| 9,226,508 | B2 | 1/2016 | Uhlmann et al. |
| 10,683,400 | B1 | 6/2020 | Rodriguez et al. |
| 10,689,542 | B2 | 6/2020 | Dustin et al. |
| 11,369,109 | B2 | 6/2022 | Gross et al. |
| 2002/0016267 | A1 | 2/2002 | Scicchitano et al. |
| 2003/0229176 | A1 | 12/2003 | Trombetta et al. |
| 2004/0019143 | A1 | 1/2004 | Koloski et al. |
| 2005/0164010 | A1 | 7/2005 | Trombetta |
| 2006/0189750 | A1 | 8/2006 | Maier et al. |
| 2007/0298216 | A1 | 12/2007 | Jing et al. |
| 2008/0219944 | A1 | 9/2008 | Longo et al. |
| 2010/0324205 | A1 | 12/2010 | Maier et al. |
| 2011/0177987 | A1 | 7/2011 | Lenting et al. |
| 2011/0213085 | A1 | 9/2011 | Tonelli et al. |
| 2011/0218290 | A1 | 9/2011 | Webster et al. |
| 2011/0229750 | A1 | 9/2011 | McLellan et al. |
| 2012/0136120 | A1 | 5/2012 | Bosman |
| 2012/0164565 | A1 | 6/2012 | Qiu |
| 2014/0113144 | A1 | 4/2014 | Loth et al. |
| 2014/0127516 | A1 | 5/2014 | Wang et al. |
| 2014/0162022 | A1 | 6/2014 | Nowak et al. |
| 2015/0158969 | A1 | 6/2015 | Nowak |
| 2015/0329453 | A1 | 11/2015 | Guarda et al. |
| 2016/0028114 | A1 | 1/2016 | Pratt et al. |
| 2016/0201005 | A1 | 7/2016 | Nowak et al. |
| 2017/0174911 | A1 | 6/2017 | Nowak et al. |
| 2019/0048223 | A1 | 2/2019 | Dustin et al. |
| 2019/0106525 | A1 | 4/2019 | Becker et al. |
| 2021/0047522 | A1 | 2/2021 | Vajo et al. |

FOREIGN PATENT DOCUMENTS

| | | |
|---|---|---|
| WO | 2013158360 A1 | 10/2013 |
| WO | 2014100778 A1 | 6/2014 |

OTHER PUBLICATIONS

Kok et al., "Influence of surface characteristics on insect residue adhesion to aircraft leading edge surfaces," Progress in Organic Coatings 76 (2013) 1567-1575.
Lee et al., "Zwitter-Wettability and Antifogging Coatings with Frost-Resisting Capabilities," ACS Nano 7 (2013) 2172-2185.
Chen et al., "Robust Prototypical Anti-icing Coatings with a Self-lubricating Liquid Water Layer between Ice and Substrate," ACS Appl. Mater. Interfaces 5 (2013) 4026-4030.
Turri et al., "Waterborne Anionomeric Polyurethane-Ureas from Functionalized Fluoropolyethers," Journal of Applied Polymer Science, vol. 93, 136-144 (2004).
Dou et al., "Anti-icing Coating with an Aqueous Lubricating Layer," ACS Appl. Mater. Interfaces 2014, 6, 6998-7003.
Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.
Chen et al., "A Thermally Re-mendable Cross-Linked Polymeric Material," Science 295 (5560), 1698-1702, Mar. 1, 2002.
Oster et al., "Photoreduction of Metal Ions by Visible Light," Departmenotf Chemistry, Polytechnic Institute of Brooklyn, 135th National meeting of the American Chemical Society, Nov. 5, 1959.
Wojtecki et al., "Using the dynamic bond to access macroscopically responsive structurally dynamic polymers," Nature Materials vol. 10, Jan. 2011.
Chen et al., "Icephobic Surfaces Induced by Interfacial Nonfrozen Water" ACS Appl. Mater. Interfaces 2017, 9, 4202-4214.
Chernyy et al., "Superhydrophilic Polyelectrolyte Brush Layers with Imparted Anti-Icing Properties: Effect of Counter ions" ACS Appl. Mater. Interfaces 2014, 6, 6487-6496.
Ryerson, "Assessment of Superstructure Ice Protection as Applied to Offshore Oil Operations Safety" US Army Research, 49, 2009.
Lauten et al., "Efficacies of Novel N-Halamine Disinfectants against *Salmonella* and *Pseudomonas* Species", Applied and Environmental Microbiology, Apr. 1992, p. 1240-1243.
Bonino et al., "Electrochemical properties of copper-based polymer electrolytes", Electrochimica Acta vol. 37, Issue 9, Jan. 1992; see Abstract.
Chin et al., "Stability of SARS-CoV-2 in different environmental conditions", Lancet Microbe 2020; published online April 2, https://doi.org/10.1016/S2666-5247(20)30003-3.
World Health Organization, "Transmission of SARS-CoV-2: implications for infection prevention precautions", Jul. 9, 2020.
Santos et al., "Recent Developments in Antimicrobial Polymers: A Review", Materials 2016, 9, 599.
US Environmental Protection Agency Office of Pesticide Programs, "Interim Method for the Evaluation of Bactericidal Activity of Hard, Non-porous Copper-Containing Surface Products" Jan. 23, 2020.
US Environmental Protection Agency Office of Pesticide Programs, "Interim Method for Evaluating the Efficacy of Antimicrobial Surface Coatings" Oct. 2, 2020.
Nowak et al., "Sprayable perfluoropolyether / poly(ethylene glycol) segmented polyurethane coatings with micron-scale phase separated 3D structure", Polymer 212 (2021) 123279.

* cited by examiner

US 11,891,538 B1

GRADIENT-RESPONSIVE CORROSION-RESISTANT COATINGS

PRIORITY DATA

This patent application claims priority to U.S. Provisional Patent App. No. 63/237,006, filed on Aug. 25, 2021, which is hereby incorporated by reference herein.

FIELD OF THE INVENTION

The present invention generally relates to anticorrosion coatings and corrosion protection systems.

BACKGROUND OF THE INVENTION

Corrosion is the gradual destruction of a metal by chemical or electrochemical reaction with their environment. Corrosion is a serious technical problem for many metal-based structures. It is well-known that the corrosion of metallic structures has a significant impact on the global economy, including infrastructure, transportation, utilities, and manufacturing. Most important is aqueous corrosion, which is corrosion in the presence of water, including bulk water or condensed films or droplets, in open environments exposed to air.

Corrosion can be concentrated locally to form a pit or crack, or it can extend across a wide area, corroding a surface. The chemistry of corrosion is complex and is considered an electrochemical phenomenon. For example, during corrosion at a particular spot on the surface of an object, oxidation takes place and that spot behaves as an anode. The electrons released at this anodic spot move through the metal and go to another spot, which behaves as a cathode. At the cathodic spot, oxygen is reduced. An electrochemical cell is essentially created, but unlike in a battery or other electrochemical device, the electrochemical cell is undesired when corrosion takes place. Methods to reduce the activity of the exposed surface, such as via passivation and chromate conversion, can decrease a material's susceptibility to electrochemical corrosion.

Coatings based on hexavalent chromate ions, $Cr^{6+}$, have anticorrosion properties. However, chromate is being phased out by regulation due to toxicity. Hexavalent chromium compounds have been the topic of intense workplace and public health concern for their carcinogenicity, and have become highly regulated. See *Occupational Exposure to Hexavalent Chromium*, U.S. Dept. of Labor, OSHA Federal Register No. 71:10099-10385, February 2006, which is incorporated by reference. In particular, concerns about the exposure of workers to chromates and dichromates while handling the immersion bath and the wet parts, as well as the small residues of those anions that remain trapped in the coating, have motivated the development of alternative commercial bath formulations that do not contain hexavalent chromium. In Europe, the RoHS and REACH Directives encourage elimination of $Cr^{6+}$ in a broad range of industrial applications and products, including chromate coating processes.

Non-chromate anticorrosion coatings developed thus far have not consistently provided sufficient corrosion protection to confidently be used in place of chromate-based coatings.

Improved anticorrosion coatings, and corrosion protection systems and methods utilizing such coatings, are still commercially desired. Anticorrosion coatings, corrosion protection systems, and methods of making and using the coatings preferably do not involve hexavalent chromate ions.

SUMMARY OF THE INVENTION

Some variations of the invention provide a gradient-responsive corrosion-resistant coating comprising:
 (a) a first layer comprising a transition metal oxide and mobile cations, wherein the transition metal oxide is ionically conductive for the mobile cations;
 (b) a second layer comprising a biphasic polymer, wherein the biphasic polymer contains ionic groups, wherein the biphasic polymer comprises a discrete phase and a continuous transport phase with an average length scale of phase separation (e.g., about 0.1-100 microns) between the discrete phase and the continuous transport phase, wherein the continuous transport phase is capable of delivering oligomers in response to corrosion byproducts, and wherein the oligomers are ionically crosslinkable with metal cations; and
 (c) optionally, a sealing layer disposed on the second layer.

In some embodiments, the transition metal oxide is selected from oxides of Ti, Zr, Hf, V, Mo, Nb, Mn, W, and combinations thereof. Other elements, such as Li, may be present in the transition metal oxide, along with a transition metal. The transition metal oxide may be selected from the group consisting of $TiO_2$, $Li_4Ti_5O_{12}$, $ZrO_2$, $HfO_2$, VO, $V_2O_3$, $V_2O_5$, $MoO_3$, $Nb_2O_5$, $MnO_2$, $WO_3$, $Na_xV_2(PO_4)_3$ ($x \leq 3$), $LiV_2(PO_4)_3$ ($x \leq 3$), $Li_7La_3Zr_2O_{12}$, $Li_{7-x}La_3Zr_{2-x}Nb_xO_{12}$ ($0 \leq x \leq 2$) and $Li_{7-x}La_3Zr_{2-x}Ta_xO_{12}$ ($0 \leq x \leq 2$); $Li_{3x}La_{0.67-x}TiO_3$ ($0.05 \leq x \leq 0.2$); $Li_{2+x}Zn_{1-x}GeO_4$ ($0 \leq x \leq 1$); $LiM_2(XO_4)$ (M=Ge, Ti, and/or Zr; X=S and/or P); and combinations thereof.

In some embodiments, the mobile cations include one or more cations selected from $H^+$, $Li^+$, $Na^+$, or $K^+$.

In some embodiments, the discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof. Polysiloxanes, when employed, may be selected from the group consisting of polydimethyl siloxane, polytrifluoropropylmethyl siloxane, polymers of aminopropylmethyl siloxane, polymers of aminoethylaminopropylmethyl siloxane, polymers of aminoethylaminoisobutylmethyl siloxane, and combinations thereof.

In some embodiments, the continuous transport phase contains a hygroscopic polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), modified cellulosic polymers, carboxymethyl cellulose, hydroxyethyl cellulose, hydroxypropyl cellulose, methyl cellulose, and combinations thereof.

In some embodiments, the continuous transport phase contains a hydrophobic, non-lipophobic polymer selected from the group consisting of poly(propylene glycol), poly(tetramethylene glycol), polybutadiene, polycarbonate, polycaprolactone, acrylic polyols, and combinations thereof.

In some embodiments, the continuous transport phase contains a hydrophilic polymer with ionic charge, wherein the ionic charge is optionally present within the hydrophilic polymer as carboxylate groups, amine groups, sulfate groups, phosphate groups, or a combination thereof.

In some embodiments, the continuous transport phase contains an electrolyte polymer selected from the group consisting of polyethylene oxide, polypropylene oxide, polycarbonates, polysiloxanes, polyvinylidene difluoride, and combinations thereof.

The ionic groups in the biphasic polymer may be contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis (2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

The oligomers delivered by the continuous transport phase may be selected from the group consisting of oligo (acrylic acid), oligo(ethylene glycol), oligo(2-hydroxyethyl methacrylate), oligo(vinyl imidazole), oligo(2-methyl-2-oxazoline), oligo(2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof.

In some embodiments, the oligomers are ionically crosslinkable via multivalent metal ions that bond with an anion form of a functional group, wherein the functional group is selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, quinone, and combinations thereof.

In some embodiments, the continuous transport phase is capable of delivering the oligomers in response to a concentration gradient of the corrosion byproducts (e.g., $H^+$ or $M^{n+}$ where M is a metal and n is the oxidation state of the metal ion). In these or other embodiments, the continuous transport phase is capable of delivering the oligomers by breaking electrostatic bonds between the oligomers and the ionic groups.

The average length scale of phase separation between the discrete phase and the continuous transport phase may be from about 0.1 microns to about 100 microns, or from about 0.1 microns to about 25 microns, for example.

The gradient-responsive corrosion-resistant coating may be disposed on a coating substrate (base metallic layer). The coating substrate may be selected from the group consisting of aluminum, iron, magnesium, nickel, chromium, titanium, molybdenum, manganese, copper, zinc, tin, lead, tungsten, vanadium, alloys thereof, and combinations of any of the foregoing. In certain embodiments, the coating substrate is selected from aluminum or aluminum alloys. Optionally, there is an adhesion layer between the first layer and the substrate.

The metal cations in are derived from the coating substrate that is to be protected from corrosion. The metal cations may include monovalent and/or multivalent cations of Al, Fe, Mg, Ni, Cr, Ti, Mo, Mn, Cu, Zn, Sn, Pb, W, and/or V.

In some embodiments of the gradient-responsive corrosion-resistant coating, the sealing layer is present. The sealing layer may be fabricated from polyurethanes, polyureas, silicones, epoxy-amine materials, polysulfides, natural or synthetic rubber, fluoropolymers, or combinations thereof, for example.

Certain variations of the invention provide a gradient-responsive corrosion-resistant coating comprising:
- (a) a first layer comprising a transition metal oxide and mobile cations, wherein the transition metal oxide is ionically conductive for the mobile cations;
- (b) optionally, a second layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
- (c) optionally, a sealing layer disposed on the second layer, if present, or disposed on the first layer if the second layer is absent.

Certain variations of the invention provide a gradient-responsive corrosion-resistant coating comprising:
- (a) optionally, a first layer comprising a transition metal oxide and mobile cations, wherein the transition metal oxide is ionically conductive for the mobile cations;
- (b) a second layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
- (c) optionally, a sealing layer disposed on the second layer.

Other variations of the invention provide a corrosion protection system comprising:
- (a) a base metallic layer;
- (b) a metal oxide layer comprising a transition metal oxide and mobile cations, wherein the transition metal oxide is ionically conductive for the mobile cations;
- (c) a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
- (d) optionally, a sealing layer disposed on the polymer layer.

In some corrosion protection systems, the base metallic layer is selected from the group consisting of aluminum, iron, magnesium, nickel, chromium, titanium, molybdenum, manganese, copper, zinc, tin, lead, tungsten, vanadium, alloys thereof, and combinations of any of the foregoing. The metal cations in the corrosion protection system are derived from the base metallic layer, and as such, may include cations of Al, Fe, Mg, Ni, Cr, Ti, Mo, Mn, Cu, Zn, Sn, Pb, W, and/or V, for example.

In some corrosion protection systems, the transition metal oxide is selected from oxides of Ti, Zr, Hf, V, Mo, Nb, Mn, W, and combinations thereof.

In some corrosion protection systems, the mobile cations include one or more cations selected from $H^+$, $Li^+$, $Na^+$, or $K^+$.

In some corrosion protection systems, the discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof.

In some corrosion protection systems, the continuous transport phase contains a hygroscopic polymer, a hydrophobic, non-lipophobic polymer, a hydrophilic polymer with ionic charge, an electrolyte polymer, or a combination thereof.

In some corrosion protection systems, the ionic groups are contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis (2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

In some corrosion protection systems, the oligomers are selected from the group consisting of oligo(acrylic acid), oligo(ethylene glycol), oligo(2-hydroxyethyl methacrylate), oligo(vinyl imidazole), oligo(2-methyl-2-oxazoline), oligo (2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof.

In some corrosion protection systems, the oligomers are ionically crosslinkable via multivalent metal ions that bond with an anion form of a functional group, wherein the functional group is selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, quinone, and combinations thereof.

The average length scale of phase separation may be from about 0.1 microns to about 100 microns, for example. In some corrosion protection systems, the average length scale of phase separation is selected from about 0.1 microns to about 25 microns.

In some corrosion protection systems, the sealing layer is present. The sealing layer may contain a sealing material selected from the group consisting of polyurethanes, silicones, epoxy-amine materials, polysulfides, natural rubber, synthetic rubber, fluoropolymers, and combinations thereof.

Other variations of the invention provide a corrosion protection system comprising:
(a) a base metallic layer;
(b) a metal oxide layer comprising a transition metal oxide and mobile cations, wherein the transition metal oxide is ionically conductive for the mobile cations;
(c) optionally, a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(d) optionally, a sealing layer disposed on the polymer layer.

Other variations of the invention provide a corrosion protection system comprising:
(a) a base metallic layer;
(b) optionally, a metal oxide layer comprising a transition metal oxide and mobile cations, wherein the transition metal oxide is ionically conductive for the mobile cations;
(c) a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(d) optionally, a sealing layer disposed on the polymer layer, if present, or disposed on the metal oxide layer, if the polymer layer is absent.

DETAILED DESCRIPTION OF EMBODIMENTS OF THE INVENTION

Figure 1:
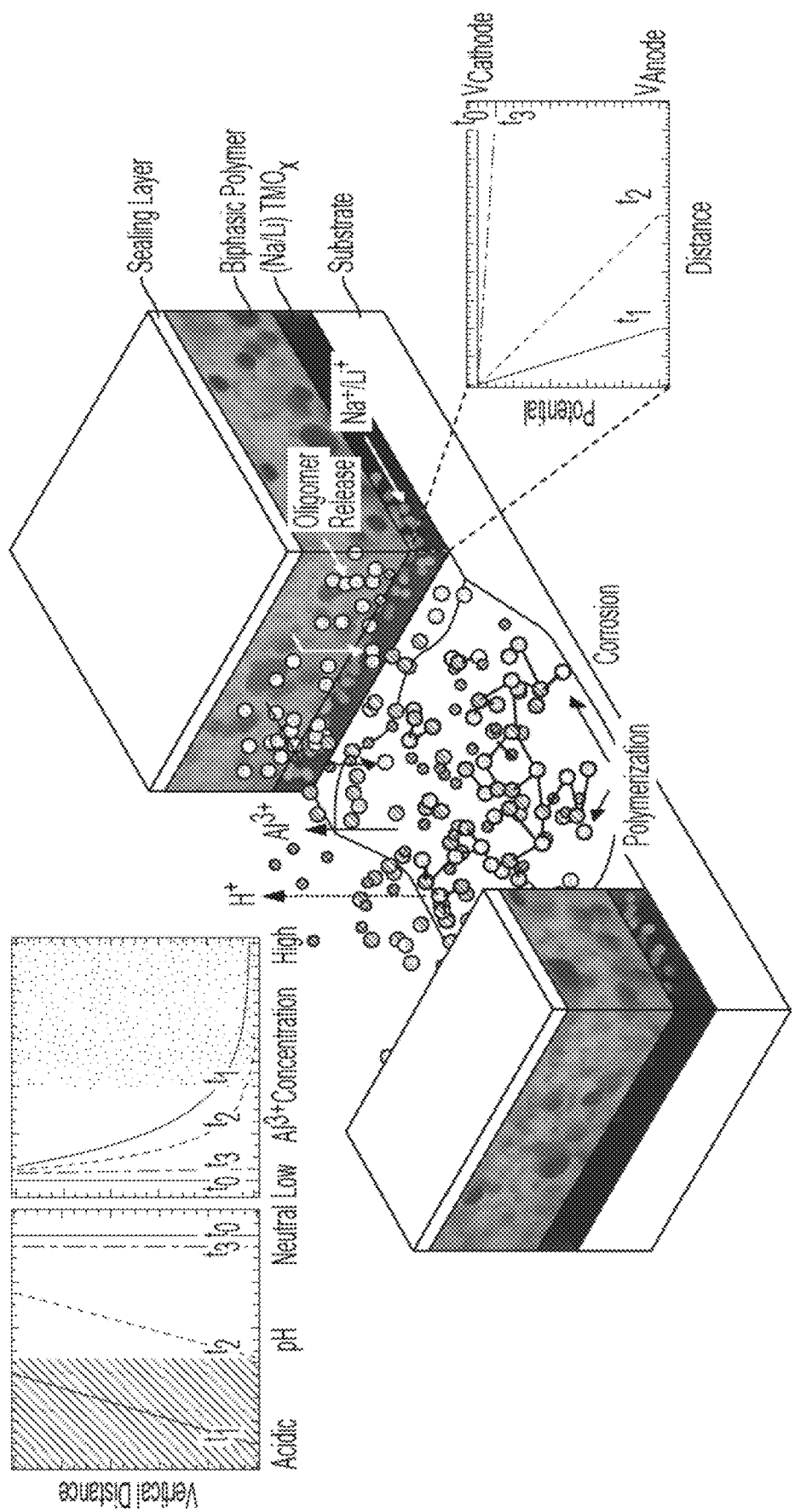
FIG. 1 is a schematic diagram of an exemplary gradient-responsive corrosion protection system that is actively responding to damage, in some embodiments.

The coatings, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Unless otherwise indicated, all properties cited in this specification are measured at a temperature of 25° C. and a pressure of 100 kPa (1 bar).

In this disclosure, Mw means the weight-average molecular weight and $M_n$ means the number-average molecular weight. Unless otherwise specified, molecular weight is Mw (weight-average basis).

Unless otherwise indicated, all references to "phases" in this patent application are in reference to solid phases or fluid phases. A "phase" is a region of space (forming a thermodynamic system), throughout which all physical properties of a material are essentially uniform. A solid phase is a region of solid material that is chemically uniform and physically distinct from other regions of solid material (or any liquid or vapor materials that may be present). Reference to multiple solid phases in a composition or microstructure means that there are at least two distinct material phases that are solid, without forming a solid solution or homogeneous mixture.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in a Markush group. Thus in some embodiments not otherwise explicitly recited, any instance of "comprising" may be replaced by "consisting of" or, alternatively, by "consisting essentially of."

Variations of the invention are premised on the discovery of gradient-responsive corrosion-resistant coatings that significantly improve corrosion resistance compared to the prior art. The gradient-responsive corrosion-resistant coatings passively responds to environmental conditions related to corrosion. In preferred variations, the corrosion-resistant coating contains (a) an ion-transporting layer that redirects ions in response to corrosion and (b) a biphasic polymer with electrostatically bound oligomers that are released in response to corrosion.

Virtually all structures are affected by corrosion. The disclosed technology applies to vehicles (transporting structures) and stationary structures, for example. The present invention provides coatings that will protect metals from corrosion up to at least 20× better than conventional non-chromate anticorrosion coatings by sensing damage (via corrosion byproducts), responding to the damage by dynamically adjusting properties to inhibit corrosion, and rejuvenating the surface. In some variations, a gradient-responsive corrosion-resistant coatings contains or consists essentially of an inorganic ion-transporting layer and a biphasic polymer with corrosion-responsive oligomers.

This technology is designed to replace chromate-based coatings and non-chromate corrosion protection coatings used in aerospace applications, for example. The best coatings currently are based on chromate ions, $Cr^{6+}$. Chromate is being phased out by regulation due to toxicity. Chromate-based corrosion protectants do not respond to corrosion; rather, they respond to water. The coating composition provided herein preferably does not contain any chromate. Non-chromate replacement coatings heretofore have not consistently provided sufficient corrosion protection to confidently be used in place of chromate coatings. Conventional non-chromate layers seal the surface but do not respond to corrosion. By contrast, the disclosed coatings respond to corrosion, as will be described in detail.

Variations of the invention can be understood with reference to FIG. 1, which is indicative of several aspects and optional features of the invention.

FIG. 1 is a schematic diagram of an exemplary gradient-responsive corrosion protection system that is actively responding to damage. The damage causes a crack or crevice, which exposes the underlying substrate (e.g., aluminum alloy). The crack or crevice is depicted as the relatively open region above the term "Corrosion" in FIG. 1. Prior to any damage, the gradient-responsive corrosion protection system is a multi-layered structure with metal substrate, metal oxide layer, polymer layer, and optional sealing layer disposed in a stacked configuration, such as shown at the far-left and far-right portions of FIG. 1. The substrate in FIG. 1 may be aluminum, an aluminum alloy (e.g., 2024 Al alloy), or another metal or metal alloy.

The corrosion protection system responds to damage in multiple ways. A transition metal oxide layer (labeled $TMO_x$ in FIG. 1) containing mobile +1 cations (such as $Na^+$ and/or $Li^+$) opposes and cancels potential gradients from spatially extended corrosion cells. A biphasic polymer coating contains organic oligomers that are released below a critical pH and polymerized above a critical $Al^{3+}$ ion concentration into a layer that protects the exposed aluminum-containing substrate. The critical pH is shown in the top-left inset graph as the line dividing the shaded region from the non-shaded region. For pH values less than the critical pH, i.e. more acidic, organic oligomers are released. The critical $Al^{3+}$ ion concentration is shown in the second-from-left inset graph as the line dividing the shaded region from the non-shaded region. For $Al^{3+}$ ion concentrations higher than the critical $Al^{3+}$ concentration, the released organic oligomers are polymerized. The $Al^{3+}$ ions are the metal cations that ionically crosslink the oligomers.

Gradients present immediately after the damage are shown at time to. Established gradients from localized corrosion in the absence of any response are shown at time $t_1$, which triggers ion movement and oligomer release. The protection system responds at time $t_2$ when oligomers bind to the surface and ions screen corrosion potentials. By time $t_3$, the protection system has shut down corrosion and eliminated or substantially reduced the gradients. Time to is an arbitrary starting time. The difference between $t_1$ and to will be dictated by the local environment and may vary widely, such as from seconds to years in the case of slow pitting corrosion. The difference between $t_2$ and $t_1$ may vary, such as from 10 seconds to about 30 minutes, for example. This difference $(t_2-t_1)$ characterizes the response time of the corrosion protection system. The difference between $t_3$ and $t_2$ may vary, such as from about 20 seconds to about 1 hour, for example. This difference $(t_3-t_2)$ characterizes the control time of the corrosion protection system to shut down corrosion after the initial response. The difference between $t_3$ and $t_1$ may be from about 10 seconds to about 90 minutes; this difference $(t_3-t_1)$ characterizes the total time of the corrosion protection system to respond to and shut down corrosion.

Localized corrosion in a crevice or protective layer can begin as uniform corrosion with atomic-scale corrosion cells consisting of exposed metal anodic sites and atomically nearby dissolved oxygen cathodic sites. These corrosion cells shut down as oxygen is consumed and not replenished in the restricted volume of the crack or crevice. New spatially extended cells develop with anodic sites still in the damaged area and cathodic sites now moved to areas where dissolved oxygen is available. These spatially extended cells cause electrochemical potential gradients (i.e., electric fields) between the anode and cathode sites. Negatively charged electrons flow through the metal substrate from anode to cathode, while anions and cations flow in solution to maintain charge balance. At the anode, metal ions are released into solution by oxidation. Without dissolved oxygen present, multiple charged ions (e.g., $Al^{3+}$, $Fe^{2+}$, $Cu^+$, etc.) react with water (e.g., via atmospheric humidity), forming $Al(OH)_x$-containing species (x=1-4), for example, and releasing protons (H+). The protons diffuse relatively quickly within the crack, thus creating a pH gradient between the crack and the external solution. The pH within the crack can decrease to 2 or 3, for example, which can stabilize the metal ions from hydrolysis. The metal ions diffuse much slower than protons, which causes a (corroding) metal ion concentration gradient with high concentrations near the substrate surface and low concentrations near the crack opening. The technology disclosed herein utilizes the gradients in (a) electrochemical potential, (b) pH, and/or (c) metal-ion concentration to respond to corrosion damage.

The corrosion protection system of FIG. 1 senses, respond to, and halts corrosion at a solid/liquid interface. The corrosion protection system combines both automatic diagnosis and treatment of corrosion. That is, the corrosion protection system does not need to be activated in order to halt corrosion, but rather functions in a passive manner. The corrosion protection system in FIG. 1 spontaneously responds to gradients in electrical potential, pH, and/or substrate metal ion concentration caused by corrosion.

The transition metal oxide ($TMO_x$) layer containing mobile monovalent (+1) cations screens electric fields created by corrosion cells to counteract the potential gradient and reduce corrosion. The mobile cations, such as $Na^+$ or $Li^+$, diffuse in response to fields created when local corrosion cells within spatially restricted damaged regions volumetrically expand as dissolved oxygen becomes depleted. The reduced potential gradient further volumetrically expands the corrosion cells, leading to 5× increased ionic resistance and thereby reduced corrosion rates.

Biphasic polymers augment the corrosion resistance (from the $TMO_x$ layer) before damage and release corrosion-responsive oligomers that become active only upon exposure to corrosion byproducts. The oligomers are automatically released in response to an ionic gradient of corrosion-generated acid, bind to corroding surfaces, and polymerize with corrosion-generated metal ions. The result is a long-lasting repair that halts ionic transport and thus terminates further corrosion.

Some variations of the invention provide a gradient-responsive corrosion-resistant coating comprising:

(a) a first layer comprising a transition metal oxide and mobile cations, wherein the transition metal oxide is ionically conductive for the mobile cations;

(b) a second layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and (c) optionally, a sealing layer disposed on the second layer.

The first layer may also be referred to herein as an inorganic layer or an inorganic first layer.

In the first layer, the transition metal oxide includes one or more transition metals. A transition metal is an element whose atom has a partially filled d sub-shell, or which can give rise to cations with an incomplete d sub-shell. For purposes of this patent application, transition metals are defined as Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Cn, La, and Ac.

In some embodiments, the transition metal oxide is selected from oxides of Ti, Zr, Hf, V, Mo, Nb, Mn, W, or combinations thereof. The transition metal oxide may be a Garnet-type structure, a Perovskite structure, a LISICON-type structure, NASICON-type structure, or a combination thereof, for example. Other elements, such as Li, may be present in the transition metal oxide, along with a transition metal.

In some embodiments, the transition metal oxide is selected from the group consisting of $TiO_2$, $Li_4Ti_5O_{12}$, $ZrO_2$, $HfO_2$, VO, $V_2O_3$, $V_2O_5$, $MoO_3$, $Nb_2O_5$, $MnO_2$, $WO_3$, $Na_xV_2(PO_4)_3$ (x≤3), $LiV_2(PO_4)_3$ (x≤3), $Li_7La_3Zr_2O_{12}$, $Li_{7-x}La_3Zr_{2-x}Nb_xO_{12}$ (0≤x≤2), $Li_{7-x}La_3Zr_{2-x}Ta_xO_{12}$ (0≤x≤2), $Li_{3x}La_{0.67-x}TiO_3$ (0.05≤x≤0.2, e.g., x≈0.1), $Li_{2+x}Zn_{1-x}GeO_4$ (0≤x≤1), $LiM_2(XO_4)$ (M=Ge, Ti, and/or Zr; X=S and/or P), and combinations thereof.

In some embodiments, the inorganic layer is formed from high-valance precursor anions including $MnO_4^-$, $VO_3^-$, $MoO_4^{2-}$, and $WO_4^{2-}$. These are anions in which the metal Mn, V, Mo, or W is in a high oxidation state, such as +6 or +7.

In some embodiments, the mobile cations are selected from the group consisting of $Li^+$, $Na^+$, $K^+$, $Rb^+$, $Cs^+$, $Ca^{2+}$, $Sr^{2+}$, and $Yb^{3+}$. In certain embodiments, the mobile cations include one or more cations selected from $H^+$, $Li^+$, $Na^+$, or $K^+$. A typical ratio of mobile cations to oxide formula unit (molar basis) is from about 0.1 to about 3, such as from about 0.1 to about 1, or from about 0.2 to about 0.5.

The diffusion coefficient for the mobile cations in the inorganic first layer at room temperature (25° C.) is preferably from about $5×10^{-12}$ cm$^2$/s to about $5×10^{-8}$ cm$^2$/s. More preferably, the diffusion coefficient for the mobile cations in the inorganic first layer at 25° C. is at least $10^{-9}$ cm$^2$/s. In various embodiments, the diffusion coefficient for the mobile cations in the inorganic first layer at 25° C. is about, or at least about, $10^{-12}$ cm$^2$/s, $10^{-11}$ cm$^2$/s, $10^{-10}$ cm$^2$/s, $10^{-9}$ cm$^2$/s, or $10^{-8}$ cm$^2$/s, including any intervening ranges.

The ionic conductivity of the mobile cations in the inorganic first layer at 25° C. is preferably from about $10^{-7}$ S/cm to about $10^{-3}$ S/cm. In various embodiments, the ionic conductivity of the mobile cations in the inorganic first layer at 25° C. is about $10^{-7}$ S/cm, $10^{-6}$ S/cm, $10^{-5}$ S/cm, $10^{-4}$ S/cm, or $10^{-3}$ S/cm, including any intervening ranges.

The inorganic first layer containing the mobile cations preferably has an electrochemical potential of approximately −1.5 V to +1.5 V versus the standard hydrogen electrode. In various embodiments, the inorganic first layer containing the mobile cations has an electrochemical potential of about −1.5 V, −1.0 V, −0.5 V, 0 V, +0.5 V, +1.0 V, or +1.5 V, including any intervening ranges.

In some embodiments, the first layer is configured for screening of electric fields. Screening is the damping of electric fields caused by the presence of mobile charge carriers. Additives such as ionic species, salts, buffers, or magnetic particles may be used in the first layer for screening of electric fields.

In the second layer, the biphasic polymer contains at least a discrete phase and a continuous transport phase. The biphasic polymer also contains ionic groups that enable reversible electrostatic binding of releasable oligomers. The discrete phase may be referred to as a structural phase of the biphasic polymer. The discrete phase may include non-fluorinated carbon-based polymers, silicones, or fluorinated polymers, for example.

In some embodiments, the discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof. Polysiloxanes, when employed, may be selected from the group consisting of polydimethyl siloxane, polytrifluoropropylmethyl siloxane, polymers of aminopropylmethyl siloxane, polymers of aminoethylaminopropylmethyl siloxane, polymers of aminoethylaminoisobutylmethyl siloxane, and combinations thereof.

The discrete phase may be from about 10 wt % to about 90 wt % of the biphasic polymer. Preferably, the discrete phase is from about 20 wt % to about 50 wt % of the biphasic polymer. In various embodiments, the discrete phase is selected to be about, at least about, or at most about 10 wt %, 20 wt %, 25 wt %, 30 wt %, 35 wt %, 40 wt %, 45 wt %, 50 wt %, 60 wt %, 70 wt %, 80 wt %, or 90 wt %, including any intervening ranges, of the biphasic polymer.

In some embodiments, the continuous transport phase contains a hygroscopic polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), modified cellulosic polymers, carboxymethyl cellulose, hydroxyethyl cellulose, hydroxypropyl cellulose, methyl cellulose, and combinations thereof.

In some embodiments, the continuous transport phase contains a hydrophobic, non-lipophobic polymer selected from the group consisting of poly(propylene glycol), poly(tetramethylene glycol), polybutadiene, polycarbonate, polycaprolactone, acrylic polyols, and combinations thereof.

In some embodiments, the continuous transport phase contains a hydrophilic polymer with ionic charge. Monomers containing ionic charge such as pendent carboxylate, amine, sulfate, and phosphate may be inserted along the polymer backbone. The ionic charge is optionally present within the hydrophilic polymer as carboxylates, sulfonates, phosphates, imidazoliums, ammoniums, amines, sulfate, or a combination thereof. In some embodiments, the polymer changes protonation in response to pH and may break ionic bonds below their pKa. In some embodiments, the polymer contains an ionic group that dissociates above its pKa into a free proton and a negatively charged species (e.g., a carboxylate). The negatively charged species can bond with a proton, thereby breaking the linkage between the cation and the ionic group, so that the cation becomes a mobile cation (e.g., Na$^+$).

In some embodiments, the continuous transport phase contains an electrolyte polymer selected from the group consisting of polyethylene oxide (synonymously, polyethylene glycol), polypropylene oxide (synonymously, polypropylene glycol), polycarbonates, polysiloxanes, polyvinylidene difluoride, and combinations thereof.

The biphasic polymer, or one of its phases, may be fabricated from polymers described in commonly owned U.S. Pat. Nos. 10,619,057, 10,400,136, and U.S. Patent App. Pub. No. 2021/0386059, which are hereby incorporated by reference herein.

The continuous transport phase may be from about 10 wt % to about 90 wt % of the biphasic polymer. Preferably, the continuous transport phase is from about 30 wt % to about 80 wt % of the biphasic polymer. In various embodiments, the continuous transport phase is selected to be about, at least about, or at most about 10 wt %, 20 wt %, 25 wt %, 30 wt %, 35 wt %, 40 wt %, 45 wt %, 50 wt %, 60 wt %, 70 wt %, 80 wt %, or 90 wt %, including any intervening ranges, of the biphasic polymer.

The biphasic polymer may contain a crosslinker (crosslinking agent) to connect the discrete and continuous transport phases. The crosslinking agent may include a moiety selected from the group consisting of an amine moiety, a hydroxyl moiety, an isocyanate moiety, and a combination thereof. The isocyanate may be blocked for stability. The biphasic polymer may alternatively, or additionally, contain chain extenders, such as polyol or polyamine chain extenders.

In some embodiments, a crosslinker or chain extender is selected from polyol or polyamine crosslinkers or chain extenders that possess a functionality of 2, 3, or greater. In various embodiments, polyol or polyamine crosslinkers or chain extenders are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

The ionic groups in the biphasic polymer may be contained chemically within the discrete phase, the continuous transport phase, or both of these. In some embodiments, the ionic groups are primarily contained chemically within the continuous transport phase. In certain alternative embodiments, some or all of the ionic groups are contained within an additional component besides the discrete phase or the continuous transport phase.

The ionic groups in the biphasic polymer may be contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis (2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

The oligomers delivered by the continuous transport phase may be selected from the group consisting of oligo (acrylic acid), oligo(ethylene glycol), oligo(2-hydroxyethyl methacrylate), oligo(vinyl imidazole), oligo(2-methyl-2-oxazoline), oligo(2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof. The oligomer backbone may include the same backbone (multiple monomer repeat units) as one or more polymers described above for the discrete and continuous transport phases.

In this specification, oligo means oligomeric, rather than monomeric. Thus, for example, oligo(ethylene glycol) refers to H—(O—CH$_2$—CH$_2$)$_n$—OH with n≥2. The number of repeat units in an oligomer is usually less than the number of repeat units in a polymer, although there is an overlap because, strictly speaking, an oligomer is also a polymer. For purposes of convenience, "oligomer" in this disclosure means that the number of repeat units is no greater than 10.

The number of repeat units in an oligomer may vary from 2 to as many as 10, such as from 2 to about 8, or from 3 to about 6. In various embodiments, the oligomers delivered by the continuous transport phase have an average number of repeat units of about, at least about, or at most about 2, 3, 4, 5, 6, 7, 8, 9, or 10, including any intervening ranges. In some embodiments, multiple distinct oligomers are delivered by the continuous transport phase. In certain embodiments, the oligomers include at least one block co-oligomer, which is analogous to a block co-polymer except that in a block co-oligomer, the number of repeat units in each block is no greater than 10.

The molecular weight Mw of the oligomer depends on the number of repeat units as well as the repeat-unit molecular weight. The oligomer Mw may be less than 5000 g/mol, preferably less than 2500 g/mol, and more preferably less than 1000 g/mol. In various embodiments, the oligomer Mw is about, or at most about, 5000 g/mol, 4000 g/mol, 3000 g/mol, 2500 g/mol, 2000 g/mol, 1500 g/mol, 1000 g/mol, or 500 g/mol, including any intervening ranges. In various embodiments, the oligomer Mw is at least about 100 g/mol, 200 g/mol, 300 g/mol, 400 g/mol, 500 g/mol, 1000 g/mol, 1500 g/mol, or 2000 g/mol, including any intervening ranges.

In some embodiments, the oligomers are ionically cross-linkable via multivalent metal ions that bond with an anion form of a functional group, wherein the functional group is selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, quinone, and combinations thereof. A "multivalent" metal ion is a metal ion $M^{n+}$, wherein n>1.

In certain embodiments, the oligomers contains ionic groups selected from the group consisting of carboxylates, sulfonates, phosphates, imidazoliums, ammoniums, and combinations thereof. These functional groups are preferred, in certain embodiments, because they change protonation in response to pH.

In some embodiments, the oligomers have the same charge as ionic groups within the continuous transport phase. The ionic groups may be bound across oppositely charge multivalent ions. For example, two carboxylates can be bridged by divalent cations such as $Ca^{2+}$ or $Mg^{2+}$. Positively charged ionic groups may be bound across carbonate, phthalate, sulfate, sulfite, chromate, dichromate, phosphate, phosphite, oxalate, and/or thiosulfate, for example.

The oligomers may contain additional functional groups to absorb onto corroding metal surfaces. These additional groups include carboxylates, thiols, alcohols, aldehydes, ketones, ethers, anilines, amines, azoles, triazoles, thiazoles, thioureas, pyridines, imidazoles, and/or quinones, for example. See Xhanari et al., "Organic corrosion inhibitors for aluminum and its alloys in chloride and alkaline solutions: A review" Arabian Journal of Chemistry (2019) Vol. 12, Issue 8, Pages 4646-4663 with supplementary information, which is hereby incorporated by reference for its teaching of corrosion-inhibiting functional groups that may be employed in oligomers herein.

The concentration of oligomers within the biphasic polymer layer may vary, such as from about 0.1 wt % to about 90 wt %, or from about 1 wt % to about 50 wt % (weight concentration based on total weight of biphasic polymer layer). In various embodiments, the concentration of oligomers within the biphasic polymer layer is about, at least about, or at most about 0.1, 0.5, 1, 2, 3, 4, 5, 10, 15, 20, 25, 30, 35, 40, 45, 50, 60, 70, 80, or 90 wt %, including any intervening ranges. In one example, 10 wt % oligomers are incorporated in a biphasic polymer, which means for instance that a 5-μm-thick patch covers the entire area of a 50-μm-thick biphasic polymer layer.

When an oligomer is chemically bonded with the continuous transport phase, then the weight concentration of oligomers also contributes toward the weight concentration of the continuous transport phase cited above. However, when free oligomers are present, those oligomers do not count toward the weight concentration of the continuous transport phase cited above. Generally speaking, when oligomers are released from the continuous transport phase, the weight concentration of the former goes up while the concentration of the latter goes down.

In some embodiments, the oligomers suspend in water before crosslinking with corrosion-generated metal ions (e.g., $Al^{3+}$). In certain embodiments, the oligomers dissolve in water before crosslinking with corrosion-generated metal ions.

In some embodiments, the metal cations are selected from the group consisting of cations of Al, Fe, Mg, Ni, Cr, Mo, Mn, Cu, Zn, Pb, W, V, and combinations thereof. The metal cations ionically crosslink or chain-extend the oligomers. Note that the metal cations are distinct from the mobile cations in the first layer. A metal cation may be a cation of a transition metal, such as nickel, copper, or tungsten, for example. In certain embodiments, the mobile cation and the metal cation are the atomically the same, and selected from Fe, Ni, Cr, Mo, Mn, Cu, Zn, W, or V.

Typically, corrosion byproducts include protons, $H^+$ which may be in the form of hydrated protons (e.g., hydronium ions, $H_3O^+$). A corrosion byproduct may be $M^{n+}$ where M is a metal and n is the oxidation state of the metal ion. An example in the case of aluminum is $Al^{3+}$. In the case of iron, whose corrosion chemistry is well-studied, corrosion byproducts may include $Fe^{2+}$, $Fe^{3+}$, $FeO$, $Fe(OH)_2$, etc. Corrosion byproducts may alternatively, or additionally, include metal hydroxides, metal hydrides, metal sulfides, metal carbides, and/or potentially other metal derivatives.

In some embodiments, the continuous transport phase is capable of delivering the oligomers in response to a concentration gradient of the corrosion byproducts. In these or other embodiments, the continuous transport phase is capable of delivering the oligomers by breaking electrostatic bonds between the oligomers and the ionic groups. In preferred embodiments, the oligomers are electrostatically bound to an oppositely charged ionic species in the continuous transport phase, unless and until the oligomers are released to halt corrosion.

The average length scale of phase separation between the discrete phase and the continuous transport phase may be from about 0.1 microns to about 100 microns, or from about 0.1 microns to about 25 microns, for example. In some biphasic polymers, the average length scale of phase separation is from about 0.5 microns to about 100 microns. In certain embodiments, the average length scale of phase separation is from about 1 micron to about 50 microns. In various embodiments, the average length scale of phase separation is from 100 nanometers to 100 microns, 100 nanometers to 500 microns, 100 nanometers to 100 microns, 100 nanometers to 200 microns, 100 nanometers to 200 microns, at least 200 nanometers, at least 500 nanometers, at least 1 micron, at least 5 microns, up to 10 microns, up to 50 microns, or up to 100 microns. Exemplary average length scales of phase separation are about, at least about, or at most about, 0.1, 0.2, 0.3, 0.4, 0.5, 1, 2, 3, 4, 5, 10, 15, 20, 25, 30, 40, 50, 60, 70, 80, 90, 100, 150, 200, 250, 300, 350, 400, 450, or 500 microns, including any intervening range (e.g., 0.1-25 µm).

In some embodiments, the second layer contains one or more additives. Exemplary additives include UV stabilizers and particulate fillers. Other additives may be introduced, if desired, to adjust pH, stability, density, viscosity, color, gloss, dispersion of solids, or other properties, for functional, ornamental, safety, or other reasons. Additives may also be incorporated within the first layer, or elsewhere within the corrosion-resistant coating besides the first or second layer.

When an additive is a UV stabilizer, it may be an antioxidant (e.g., a thiol), a hindered amine (e.g., a derivative of tetramethylpiperidine), UV-absorbing nanoparticles (e.g., $TiO_2$, ZnO, CdS, CdTe, or ZnS—Ag nanoparticles), or a combination thereof, for example.

When an additive is a particulate filler, it may be selected from the group consisting of silica, alumina, silicates, talc, aluminosilicates, barium sulfate, mica, diatomite, calcium carbonate, calcium sulfate, carbon, wollastonite, and a combination thereof, for example. A particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof, for example.

The gradient-responsive corrosion-resistant coating is typically disposed on a coating substrate, for purposes of protecting that substrate from corrosion. The coating substrate may also be referred to as a base metallic layer. The gradient-responsive corrosion-resistant coating may be continuous or discontinuous on the substrate. Preferably, the coating is continuous, i.e. it covers the entire substrate. However, in some embodiments, only portions of a substrate, such as regions that are more susceptible to corrosion, are coated with the gradient-responsive corrosion-resistant coating.

The coating substrate may be selected from the group consisting of aluminum, iron, magnesium, titanium, copper, nickel, zinc, tin, alloys thereof (e.g., steel, brass, or bronze), and combinations of any of the foregoing. The substrate metal may also form a metal oxide. For example, an Al surface may form a $Al_2O_3$ passivation layer.

In certain embodiments, the coating substrate is selected from aluminum or aluminum alloys. The coating protection mechanism taught herein works for aluminum, aluminum alloys, iron, steel, and many other metals and metal alloys. In this specification, aluminum is a typical substrate. During corrosion, the aluminum may form $Al^{3+}$, $Al_2O_3$, $Al(OH)_3$, or other aluminum-derived species. It should be understood that for other base metal substrates, other corrosion byproducts will of course be present.

On the substrate surface of a corroding metal, the oligomers may be crosslinked by Al, Fe, Mg, Ni, Cr, Mo, Mn, Cu, Zn, Pb, W, and/or V cations. Such cations may be formed as ions from the base metal that is undergoing corrosion. As just one example, for a steel substrate, corrosion-induced $Fe^{3+}$ and $Cr^{2+}$ cations may cause crosslinking of oligomers.

The geometry of the substrate may vary widely. Examples include flat plates, sheets, panels, bars, rods, beams, curved structures, and arbitrary geometries. The substrate may be fabricated using known techniques, including additive manufacturing, to create essentially any 3D geometry. Typically, the corrosion-resistant coating takes on the geometry of the substrate. The coating thickness may vary along the length of the substrate and/or there may be coating features built into the substrate surface, such as pillars pointing out from the surface.

In certain embodiments, a base-metal substrate is located on more than one side of a structure. For example, a base-metal substrate may be formed such that there are perpendicular substrate surfaces, or substrates at an angle with each other, with the corrosion-resistant coating forming a region that protects both substrate surfaces. In another embodiment, a sandwich structure contains the corrosion-resistant coating in an interior region between outer substrate layers.

Optionally, there is an adhesion layer between the first layer and the substrate. The adhesion layer may include a material selected from epoxies, acrylics (e.g., cyanoacrylate), silicones, carboxylated styrene-butadiene polymers, alkoxysilanes, zirconates, titanium alkoxides, or combinations thereof, for example. The adhesion layer may be continuous or discontinuous (e.g., as periodic adhesion regions). An adhesion layer is not depicted in FIG. 1.

In some embodiments of the gradient-responsive corrosion-resistant coating, the sealing layer is present (as depicted in FIG. 1). The sealing layer helps the structure further resist the environment. The sealing layer may be fabricated from polyurethanes, silicones, epoxy-amine materials, polysulfides, natural or synthetic rubber, fluoropolymers, or combinations thereof, for example.

Certain variations of the invention provide a gradient-responsive corrosion-resistant coating comprising:
(a) a first layer comprising a transition metal oxide and mobile cations, wherein the transition metal oxide is ionically conductive for the mobile cations;
(b) optionally, a second layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(c) optionally, a sealing layer disposed on the second layer, when present.

Certain variations of the invention provide a gradient-responsive corrosion-resistant coating comprising:
(a) optionally, a first layer comprising a transition metal oxide and mobile cations, wherein the transition metal oxide is ionically conductive for the mobile cations;
(b) a second layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(c) optionally, a sealing layer disposed on the second layer.

Other variations of the invention provide a corrosion protection system comprising:
(a) a base metallic layer;
(b) a metal oxide layer comprising a transition metal oxide and mobile cations, wherein the transition metal oxide is ionically conductive for the mobile cations;
(c) a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(d) optionally, a sealing layer disposed on the polymer layer.

Typically, as in FIG. 1, the metal oxide layer is disposed on the base metallic layer; the polymer layer is disposed on the metal oxide layer; and the sealing layer, if present, is disposed on the polymer layer.

In an alternative embodiment, the placement of the polymer layer and metal oxide layer is reversed. In particular, the polymer layer is disposed on the base metallic layer; the metal oxide layer is disposed on the polymer layer; and the sealing layer, if present, is disposed on the metal oxide layer.

In certain embodiments, rather than a sealing layer, or in addition to a sealing layer, there is another substrate layer. Various sandwich configurations include substrate/first layer/second layer/substrate, substrate/second layer/first layer/substrate, substrate/first layer/second layer/sealing layer/substrate, etc.

In some corrosion protection systems, the base metallic layer is selected from the group consisting of aluminum, iron, magnesium, titanium, copper, nickel, zinc, tin, alloys thereof, and combinations of any of the foregoing.

In some corrosion protection systems, the transition metal oxide is selected from oxides of Ti, Zr, Hf, V, Mo, Nb, Mn, W, and combinations thereof.

In some corrosion protection systems, the mobile cations include one or more cations selected from $H^+$, $Li^+$, $Na^+$, or $K^+$.

In some corrosion protection systems, the discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof.

In some corrosion protection systems, the continuous transport phase contains a hygroscopic polymer, a hydrophobic, non-lipophobic polymer, a hydrophilic polymer with ionic charge, an electrolyte polymer, or a combination thereof.

In some corrosion protection systems, the ionic groups are contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

In some corrosion protection systems, the oligomers are selected from the group consisting of oligo(acrylic acid), oligo(ethylene glycol), oligo(2-hydroxyethyl methacrylate), oligo(vinyl imidazole), oligo(2-methyl-2-oxazoline), oligo(2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof.

In some corrosion protection systems, the oligomers are ionically crosslinkable via multivalent metal ions that bond with an anion form of a functional group, wherein the functional group is selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, quinone, and combinations thereof.

In some corrosion protection systems, the metal cations are selected from the group consisting of cations of Al, Fe, Mg, Ni, Cr, Mo, Mn, Cu, Zn, Pb, W, V, and combinations thereof.

In some corrosion protection systems, the metal cations include cations of elements contained in the base metallic layer.

The average length scale of phase separation may be from about 0.1 microns to about 100 microns, for example. In some corrosion protection systems, the average length scale of phase separation is selected from about 0.1 microns to about 25 microns.

In some corrosion protection systems, the sealing layer is present. The sealing layer may contain a sealing material selected from the group consisting of polyurethanes, silicones, epoxy-amine materials, polysulfides, natural rubber, synthetic rubber, fluoropolymers, and combinations thereof.

Other variations of the invention provide a corrosion protection system comprising:
(a) a base metallic layer;
(b) a metal oxide layer comprising a transition metal oxide and mobile cations, wherein the transition metal oxide is ionically conductive for the mobile cations;
(c) optionally, a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(d) optionally, a sealing layer disposed on the polymer layer.

Other variations of the invention provide a corrosion protection system comprising:
(a) a base metallic layer;
(b) optionally, a metal oxide layer comprising a transition metal oxide and mobile cations, wherein the transition metal oxide is ionically conductive for the mobile cations;
(c) a polymer layer comprising a biphasic polymer, wherein the biphasic polymer contains ionic groups, wherein the biphasic polymer comprises a discrete phase and a continuous transport phase with an average length scale of phase separation between the discrete phase and the continuous transport phase, wherein the continuous transport phase is capable of delivering oligomers in response to corrosion byproducts, and wherein the oligomers are ionically crosslinkable with metal cations; and
(d) optionally, a sealing layer disposed on the polymer layer, if present, or disposed on the metal oxide layer, if the polymer layer is absent.

Some variations of the invention will now be further described, including description of chemistry and electrochemistry taking place in the gradient-response corrosion-resistant coatings and the corrosion protection systems. The present invention is not limited by theory or hypothesis.

The first layer is an ion-transporting layer that reduces corrosion rates by up to at least 5× versus a passive conversion coating. For electrodes and electrolytes in lithium-ion or sodium-ion batteries, mobility of Li or Na monovalent alkali ions is important for achieving high rates of charge and discharge. Many electrode/electrolyte materials have been developed, including Li/Ti, Li/V, and Li/Mn, or oxides thereof, for example. Similarly, non-chromate conversion coatings have been developed based on oxides of V, Mn, Mo, and W.

A possible mechanism for reduction in corrosion in the ion-transporting layer is the diffusion of the mobile ions under the influence of electrochemical potential gradients (electric fields). Local corrosion cells develop with separated anodic and cathodic areas. As potential gradients emerge, field-driven diffusion of mobile ions in a coating can oppose and reduce the gradients (FIG. 1, $t_2$) or even eliminate the gradients (FIG. 1, $t_3$). With lower gradients, larger spatial separation (than caused by oxygen depletion) is typically needed to achieve the original potential difference. This further separation increases the solution resistance and decreases the corrosion current. Assuming a cell voltage of about 1 V and an oxygen-depleted crack with anode-cathode separation of 25 µm, the potential gradient is initially about 40 mV/µm at time $t_1$ in FIG. 1. A simple electrostatic calculation using unit charges indicates that ion drift of about 0.2 µm from equilibrium gives an equal opposing field. Considering that battery electrode materials have particle sizes on the order of 10 µm, the mobility may provide a 5× gradient reduction, at least.

The second layer comprising a biphasic polymer is preferably included in the coating protection system. The biphasic polymers form from the thermodynamically driven phase separation of dissimilar polymer precursors into a surface chemistry-controlling discrete phase and a continuous phase that provides fast and triggerable transport and release of active materials. In some embodiments, a water-resistant discrete phase is crosslinked with a continuous phase that stores and delivers corrosion-responsive oligomers. The biphasic structure creates a durable coating from the combination of hydrogen bonds and flexible segments similar to biological systems (proteins).

Figure 2:
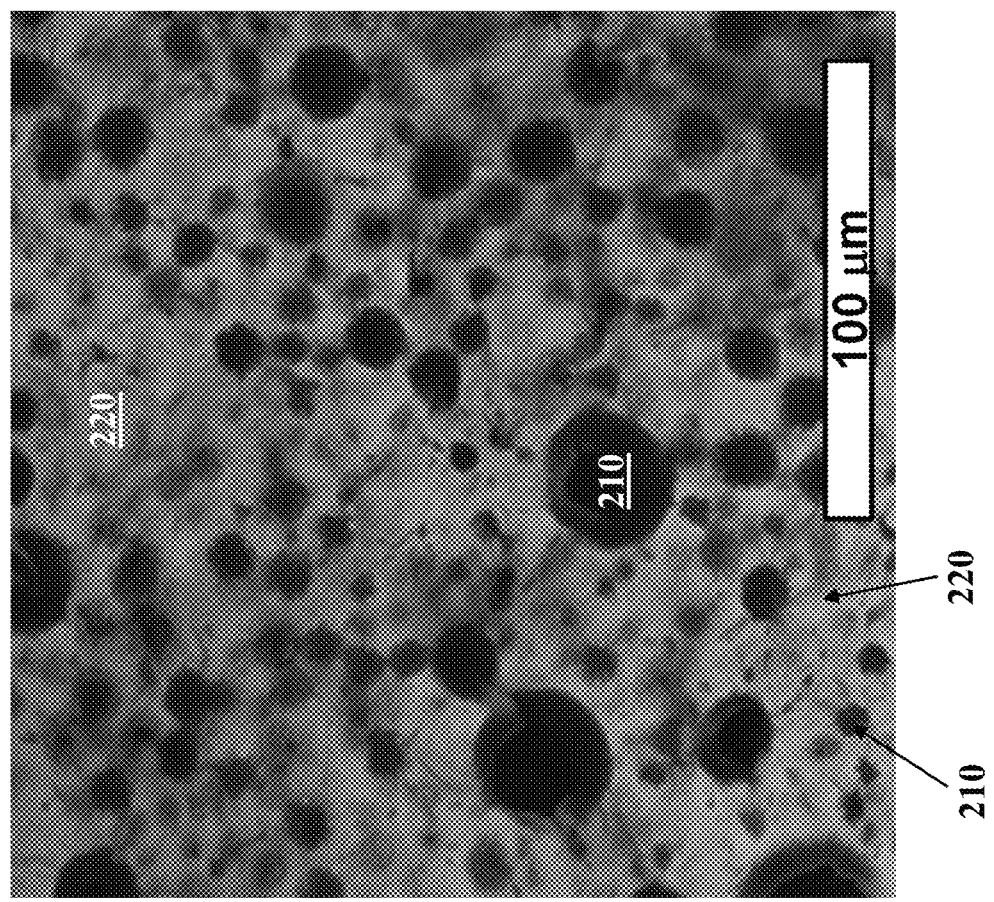
FIG. 2 is an illustration of an exemplary biphasic polymer with a discrete phase (darker regions) and a continuous phase (lighter regions) that releases corrosion-responsive oligomers when exposed to a gradient of corrosion byproducts.

FIG. 2 is an illustration of an exemplary biphasic polymer with a discrete phase (darker regions) that acts as an environmental barrier (e.g., abrasion resistance) and a continuous phase (lighter regions) that releases corrosion-responsive oligomers when exposed to a gradient of corrosion byproducts. The exemplary biphasic polymer 200 depicted in FIG. 2 is a top or side view of the biphasic polymer in FIG. 1. The biphasic polymer 200 contains a discrete phase 210 and a continuous transport phase 220. The 100-micron scale bar in FIG. 2 is exemplary and indicative of the length scales of the discrete phase 210, the continuous transport phase 220, and the distance between the phases.

Oligomers in the continuous transport phase respond to gradients in corrosion byproducts and remove those gradients after inhibiting corrosion. During cyclic fatigue, protons are generated from the formation of aluminum hydroxide in cracks ($t_1$ in FIG. 1), which frees carboxylate groups on the oligomers that are electrostatically bonded to the continuous transport phase. The oligomers then diffuse along a density gradient to reach the corroding area and bind with reactive groups, such as thiol groups. $Al^3$ ions are concentrated at the surface and crosslink the carboxylate groups over the corroding area ($t_2$ in FIG. 1). The crosslinked mass of oligomers inhibits ion transport needed for corrosion, and the $H^+$ and $Al^{3+}$ gradients dissipate ($t_3$ in FIG. 1). The oligomers surpass the anticorrosion performance of conventional organic corrosion inhibitors because the oligomers only become active in response to corrosion byproducts and crosslink with $Al^{3+}$, rather than remaining discrete, over the damaged area.

Current state-of-the-art non-chromate conversion coatings have generalcorrosion polarization resistances of about 2-4 MΩ·cm$^2$. By contrast, in some embodiments of the present invention, mobile ions reduce field gradients by at least 5×, resulting in a resistance of >10 MΩ·cm$^2$. Significant additional increases in resistance up to 20× (~40 MΩ·cm$^2$) are possible via optimization of ion mobility and concentration, in various embodiments herein. Furthermore, by combining the disclosed inorganic layer with the disclosed biphasic polymer layer, which itself is optimized for corrosion protection with a resistance of $10^{-1000}$ MΩ·cm$^2$, for example, at least a 20× improvement in resistance may be achieved relative to the prior art. The structure of FIG. 1 utilizes both the inorganic layer and the biphasic polymer layer, but it should be understood that certain structures utilize only the inorganic layer, or only the biphasic polymer layer.

The corrosion-resistant coating may have a thickness from about 1 micron to about 2000 microns, for example. In various embodiments, the corrosion-resistant coating thickness is about, at least about, or at most about 1 µm, 10 µm, 50 µm, 100 µm, 200 µm, 300 µm, 400 µm, 500 µm, 600 µm, 700 µm, 800 µm, 900 µm, 1000 µm, 1500 µm, or 2000 µm, including any intervening ranges.

The thickness of the inorganic first layer (with transition metal oxide) may be selected from about 100 nanometers to about 10 microns, for example. In various embodiments, the thickness of the inorganic first layer is about, at least about, or at most about 100 nm, 200 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, or 10 µm, including any intervening ranges. In embodiments employing the second layer (i.e., the biphasic polymer layer) but not the inorganic first layer, the thickness of the inorganic first layer is zero.

The thickness of the second layer (with biphasic polymer) may be selected from about 500 nanometers to about 1000 microns, for example. In various embodiments, the thickness of the second layer is about, at least about, or at most about 0.5 µm, 1 µm, 5 µm, 10 µm, 25 µm, 50 µm, 100 µm, 200 µm, 300 µm, 400 µm, 500 µm, 600 µm, 700 µm, 800 µm, 900 µm, or 1000 µm, including any intervening ranges. In embodiments employing the inorganic first layer but not the second layer (i.e., the biphasic polymer layer), the thickness of the second layer is zero.

The thickness of the sealing layer, when present, may be selected from about 1 micron to about 1000 microns, for example. In various embodiments, the thickness of the sealing layer is about, at least about, or at most about 1 µm, 5 µm, 10 µm, 25 µm, 50 µm, 100 µm, 200 µm, 300 µm, 400 µm, 500 µm, 600 µm, 700 µm, 800 µm, 900 µm, or 1000 µm, including any intervening ranges.

When the corrosion-resistant coating is disposed on a substrate to form a corrosion protection system, the thickness or other dimensions of the substrate may vary widely. The substrate thickness may be selected about 1 micron to about 1 meter, for example. In various embodiments, the substrate thickness is about, at least about, or at most about 1 µm, 10 µm, 100 µm, 1000 µm, 10 mm, 100 mm, or 1000 mm, including any intervening ranges, or even larger.

The weight percentages of the different layers will be dictated by the respective layer thicknesses and densities.

In various embodiments, the weight percentage of the inorganic first layer (relative to the total weight of the corrosion-resistant coating, not including the substrate) is about, at least about, or at most about 0.1 wt %, 0.5 wt %, 1 wt %, 5 wt %, 10 wt %, 15 wt %, 20 wt %, 25 wt %, 30 wt %, 35 wt %, 40 wt %, 45 wt %, or 50 wt %, including any intervening ranges. When the inorganic first layer is omitted, it is 0 wt %.

In various embodiments, the weight percentage of the second layer (relative to the total weight of the corrosion-resistant coating, not including the substrate) is about, at least about, or at most about 0.2 wt %, 0.5 wt %, 1 wt %, 5 wt %, 10 wt %, 15 wt %, 20 wt %, 25 wt %, 30 wt %, 35 wt %, 40 wt %, 45 wt %, 50 wt %, 60 wt %, 70 wt %, 80 wt %, or 90 wt %, including any intervening ranges. When the second layer (i.e., the biphasic polymer layer) is omitted, it is 0 wt %.

In various embodiments, the weight percentage of the sealing layer (relative to the total weight of the corrosion-resistant coating, not including the substrate) is about, at least about, or at most about 1 wt %, 5 wt %, 10 wt %, 15 wt %, 20 wt %, 25 wt %, 30 wt %, 35 wt %, 40 wt %, 45 wt %, or 50 wt %, including any intervening ranges. When the sealing layer is omitted, it is 0 wt %.

Multiscale modeling may be employed to aid the design of gradient-responsive corrosion-resistant coatings and coating protection systems. Computer calculations may be employed to simulate the chemistry, electrochemistry, physics, fluid flow, and other dynamics involved in the corrosion process.

A corrosion protection system may be monitored for corrosion or the prevention thereof. For example, a corrosion protection system that has been applied to a metallic object may be periodically or continuously monitored by visual inspection, imaging analysis, ultrasonic testing, radiographic testing, and magnetic flux leakage.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A gradient-responsive corrosion-resistant coating comprising:
   (a) a first layer comprising a transition metal oxide and mobile cations, wherein said transition metal oxide is ionically conductive for said mobile cations;
   (b) a second layer comprising a biphasic polymer, wherein said biphasic polymer contains ionic groups, wherein said biphasic polymer comprises a discrete phase and a continuous transport phase with an average length scale of phase separation between said discrete phase and said continuous transport phase, wherein said continuous transport phase is capable of delivering oligomers in response to corrosion byproducts, and wherein said oligomers are ionically crosslinkable with metal cations; and (c) optionally, a sealing layer disposed on said second layer.

2. The gradient-responsive corrosion-resistant coating of claim 1, wherein said transition metal oxide is selected from oxides of Ti, Zr, Hf, V, Mo, Nb, Mn, W, and combinations thereof.

3. The gradient-responsive corrosion-resistant coating of claim 1, wherein said transition metal oxide is selected from the group consisting of $TiO_2$, $Li_4Ti_5O_{12}$, $ZrO_2$, $HfO_2$, VO, $V_2O_3$, $V_2O_5$, $MoO_3$, $Nb_2O_5$, $MnO_2$, $WO_3$, $Na_xV_2(PO_4)_3$ ($x \leq 3$), $LiV_2(PO_4)_3$ ($x \leq 3$), $Li_7La_3Zr_2O_{12}$, $Li_{7-x}La_3Zr_{2-x}Nb_xO_{12}$ ($0 \leq x \leq 2$) and $Li_{7-x}La_3Zr_{2-x}Ta_xO_{12}$ ($0 \leq x \leq 2$); $Li_{3x}La_{0.67-x}TiO_3$ ($0.05 \leq x \leq 0.2$); $Li_{2+x}Zn_{1-x}GeO_4$ ($0 \leq x \leq 1$); $LiM_2(XO_4)$ (M=Ge, Ti, and/or Zr; X=S and/or P); and combinations thereof.

4. The gradient-responsive corrosion-resistant coating of claim 1, wherein said mobile cations include one or more cations selected from $H^+$, $Li^+$, $Na^+$, or $K^+$.

5. The gradient-responsive corrosion-resistant coating of claim 1, wherein said discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof.

6. The gradient-responsive corrosion-resistant coating of claim 5, wherein said polysiloxanes are selected from the group consisting of polydimethyl siloxane, polytrifluoropropylmethyl siloxane, polymers of aminopropylmethyl siloxane, polymers of aminoethylaminopropylmethyl siloxane, polymers of aminoethylaminoisobutylmethyl siloxane, and combinations thereof.

7. The gradient-responsive corrosion-resistant coating of claim 1, wherein said continuous transport phase contains a hygroscopic polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), modified cellulosic polymers, carboxymethyl cellulose, hydroxyethyl cellulose, hydroxypropyl cellulose, methyl cellulose, and combinations thereof.

8. The gradient-responsive corrosion-resistant coating of claim 1, wherein said continuous transport phase contains a hydrophobic, non-lipophobic polymer selected from the group consisting of poly(propylene glycol), poly(tetramethylene glycol), polybutadiene, polycarbonate, polycaprolactone, acrylic polyols, and combinations thereof.

9. The gradient-responsive corrosion-resistant coating of claim 1, wherein said continuous transport phase contains a hydrophilic polymer with ionic charge, wherein said ionic charge is optionally present within said hydrophilic polymer as carboxylate groups, amine groups, sulfate groups, phosphate groups, or a combination thereof.

10. The gradient-responsive corrosion-resistant coating of claim 1, wherein said continuous transport phase contains an electrolyte polymer selected from the group consisting of polyethylene oxide, polypropylene oxide, polycarbonates, polysiloxanes, polyvinylidene difluoride, and combinations thereof.

11. The gradient-responsive corrosion-resistant coating of claim 1, wherein said ionic groups are contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

12. The gradient-responsive corrosion-resistant coating of claim 1, wherein said oligomers are selected from the group consisting of oligo(acrylic acid), oligo(ethylene glycol), oligo(2-hydroxyethyl methacrylate), oligo(vinyl imidazole), oligo(2-methyl-2-oxazoline), oligo(2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof.

13. The gradient-responsive corrosion-resistant coating of claim 1, wherein said oligomers are ionically crosslinkable via one or more functional groups selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, and quinone.

14. The gradient-responsive corrosion-resistant coating of claim 1, wherein said metal cations are selected from the group consisting of cations of Al, Fe, Mg, Ni, Cr, Mo, Mn, Cu, Zn, Pb, W, V, and combinations thereof.

15. The gradient-responsive corrosion-resistant coating of claim 1, wherein said continuous transport phase is capable of delivering said oligomers in response to a concentration gradient of said corrosion byproducts.

16. The gradient-responsive corrosion-resistant coating of claim 1, wherein said continuous transport phase is capable of delivering said oligomers by breaking electrostatic bonds between said oligomers and said ionic groups.

17. The gradient-responsive corrosion-resistant coating of claim 1, wherein said average length scale of phase separation is from about 0.1 microns to about 100 microns.

18. The gradient-responsive corrosion-resistant coating of claim 1, wherein said sealing layer is present.

19. A corrosion protection system comprising:
(a) a base metallic layer;
(b) a metal oxide layer comprising a transition metal oxide and mobile cations, wherein said transition metal oxide is ionically conductive for said mobile cations;
(c) a polymer layer comprising a biphasic polymer, wherein said biphasic polymer contains ionic groups, wherein said biphasic polymer comprises a discrete phase and a continuous transport phase with an average length scale of phase separation between said discrete phase and said continuous transport phase, wherein said continuous transport phase is capable of delivering oligomers in response to corrosion byproducts, wherein said oligomers are ionically crosslinkable with metal cations, and wherein said metal cations include cations of elements contained in said base metallic layer; and (d) optionally, a sealing layer disposed on said polymer layer.

20. The corrosion protection system of claim 19, wherein said base metallic layer is selected from the group consisting of aluminum, iron, magnesium, titanium, copper, nickel, zinc, tin, alloys thereof, and combinations of any of the foregoing.

21. The corrosion protection system of claim 19, wherein said transition metal oxide is selected from oxides of Ti, Zr, Hf, V, Mo, Nb, Mn, W, and combinations thereof.

22. The corrosion protection system of claim 19, wherein said mobile cations include one or more cations selected from $H^+$, $Li^+$, $Na^+$, or $K^+$.

23. The corrosion protection system of claim 19, wherein said discrete phase contains a polymer selected from the group consisting of polyalkanes, polyurethanes, polyureas, polyesters, polycarbonates, polyacrylates, fluorinated polyols, perfluorocarbons, perfluoropolyethers, polyfluoroacrylates, polyfluorosiloxanes, polyvinylidene fluoride, polytrifluoroethylene, polysiloxanes, and combinations thereof.

24. The corrosion protection system of claim 19, wherein said continuous transport phase contains a hygroscopic polymer, a hydrophobic, non-lipophobic polymer, a hydrophilic polymer with ionic charge, an electrolyte polymer, or a combination thereof.

25. The corrosion protection system of claim 19, wherein said ionic groups are contained in, or derived from, ionic species selected from the group consisting of 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, (2,2-bis-(1-(1-methyl imidazolium)-methylpropane-1,3-diol bromide), 1,2-bis(2'-hydroxyethyl)imidazolium bromide, and (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and analogues, combinations, derivatives, or reaction products thereof.

26. The corrosion protection system of claim 19, wherein said oligomers are selected from the group consisting of oligo(acrylic acid), oligo(ethylene glycol), oligo(2-hydroxyethyl methacrylate), oligo(vinyl imidazole), oligo(2-methyl-2-oxazoline), oligo(2-ethyl-2-oxazoline), oligo(vinylpyrrolidone), oligo(propylene glycol), oligo(tetramethylene glycol), oligobutadiene, oligocarbonate, oligocaprolactone, oligoacrylic polyol, carboxymethyl cellulose, hydroxyethyl cellulose, hydroxypropyl cellulose, methyl cellulose, and combinations thereof.

27. The corrosion protection system of claim 19, wherein said oligomers are ionically crosslinkable via one or more functional groups selected from the group consisting of carbonate, phthalate, sulfate, sulfite, chromate, dichromate, phosphate, phosphite, oxalate, thiosulfate, carboxylate, thiol, alcohol, aldehyde, ketone, ether, aniline, amine, azole, triazole, thiazole, thiourea, pyridine, imidazole, and quinone.

28. The corrosion protection system of claim 19, wherein said metal cations are selected from the group consisting of cations of Al, Fe, Mg, Ni, Cr, Mo, Mn, Cu, Zn, Pb, W, V, and combinations thereof.

29. The corrosion protection system of claim 19, wherein said average length scale of phase separation is from about 0.1 microns to about 100 microns.

30. The corrosion protection system of claim 19, wherein said sealing layer is present and contains a sealing material selected from the group consisting of polyurethanes, silicones, epoxy-amine materials, polysulfides, natural rubber, synthetic rubber, fluoropolymers, and combinations thereof.

* * * * *